(12) United States Patent
Hsieh et al.

(10) Patent No.: US 7,534,400 B2
(45) Date of Patent: May 19, 2009

(54) WET SCRUBBING APPARATUS FOR CONTROLLING NOX EMISSION

(75) Inventors: Joseph Hsieh, Parsippany, NJ (US); Kevin R. Gilman, Parsippany, NJ (US); Dominique Philibert, Parsippany, NJ (US); Scott Eagleson, Parsippany, NJ (US); Andrew Morin, Parsippany, NJ (US)

(73) Assignee: Belco Technologies Corporation, Parsippany, NJ (US)

( * ) Notice: Subject to any disclaimer, the term of this patent is extended or adjusted under 35 U.S.C. 154(b) by 162 days.

(21) Appl. No.: 11/729,545

(22) Filed: Mar. 28, 2007

(65) Prior Publication Data
US 2007/0189949 A1    Aug. 16, 2007

Related U.S. Application Data

(62) Division of application No. 10/677,052, filed on Oct. 1, 2003, now Pat. No. 7,214,356.

(60) Provisional application No. 60/485,780, filed on Jul. 9, 2003.

(51) Int. Cl.
*B01D 50/00* (2006.01)
(52) U.S. Cl. .................................. 422/182; 422/168
(58) Field of Classification Search .......... 422/168, 422/169, 182; 423/235, 239.1
See application file for complete search history.

(56) References Cited

U.S. PATENT DOCUMENTS

| | | | |
|---|---|---|---|
| 420,378 | A | 1/1890 | Dye |
| 3,949,057 | A | 4/1976 | Gilbert, Jr. |
| 4,035,470 | A | 7/1977 | Senjo et al. |
| 4,107,271 | A | 8/1978 | Atsukawa et al. |
| 4,351,810 | A | 9/1982 | Martinez et al. |
| 4,844,874 | A | 7/1989 | deVries |
| 4,999,167 | A | 3/1991 | Skelley et al. |
| 5,206,002 | A | 4/1993 | Skelley et al. |
| 5,316,737 | A | 5/1994 | Skelley et al. |
| 5,354,482 | A | 10/1994 | Varadi |
| 6,004,379 | A | 12/1999 | Wallace et al. |
| 6,063,348 | A | 5/2000 | Hinke et al. |
| 6,136,283 | A | 10/2000 | Stern |
| 6,136,284 | A | 10/2000 | Hwang et al. |
| 6,162,409 | A | 12/2000 | Skelley et al. |
| 6,197,268 | B1 | 3/2001 | Hwang et al. |
| 6,231,648 | B1 | 5/2001 | Marlowe |
| 6,231,824 | B1 | 5/2001 | Tseng et al. |
| 6,294,139 | B1 | 9/2001 | Vicard et al. |
| 6,506,351 | B1 | 1/2003 | Jain et al. |
| 6,761,863 | B2 | 7/2004 | Hwang et al. |

OTHER PUBLICATIONS

Weaver, Edwin H. and Bourgoin, Stephane, "Pollution Control System Design for Achieving Stringent Emissions Standards on Waste Incineration Facilities—A Case Study", Air & Waste Management Association's 91st Annual Meeting & Exhibition, Jun. 14-18, 1998, San Diego, California ("Weaver I").
Weaver, Edwin H. Confurto, Nicholas, and Weber, John R. "FCCU Regenerator Flue Gas Cleaning", Hydrocarbon Engineering, Jul./Aug. 1999, p. 46-49 ("Weaver II").
Confurto, Nicholas, "Managing Sulfur Emissions", Hydrocarbon Engineering, Sep. 2000, p. 28-32. ("Confurto").
Belco Technologies Corporation Advertisement entitled "EDV® Wet Scrubbing", undated ("Belco Advertisement"), no date.
Weaver, Edwin H. and Bourgoin, Stephane, "Pollution Control System Design for Achieving Stringet Emissions Standards on Waste Incineration Facilities—A Case Study", Air & Waste Management Association's gist Annual Meeting & Exhibition, Jun. 14-18, 1998, San Diego, California ("Weaver I").
Dec. 13, 2006 letter from John M. Adams, Esq., representing Cannon Technology, Inc., to April Capati, Esq., representing the assignee, Belco Technologies Corporation.
Draft Protest Under 37 CFR 1.291(a), no date.
Becl Technologies Corporation Advertisement entitled EDVO Wet Scrubbing FCCU and Refinery Applications, no date.
Nov. 10. 2005 letter from Mr. Adams to Ms. Capati.

*Primary Examiner*—Edward M Johnson
(74) *Attorney, Agent, or Firm*—Lerner, David, Littenberg, Krumholz & Mentlik, LLP

(57) ABSTRACT

An apparatus for controlling NOx emissions which includes a chamber having a wall surface and an interior, a flue gas entrance and a flue gas exit for a flue gas to enter and exit the interior of the chamber, a gas quenching zone in which the temperature of the gas can be lowered, an ozone injection and retention zone in the chamber, and a liquid spray zone including at least one spray nozzle for spraying a liquid towards the wall surface.

30 Claims, 7 Drawing Sheets

US 7,534,400 B2

WET SCRUBBING APPARATUS FOR CONTROLLING NOX EMISSION

CROSS REFERENCE TO RELATED APPLICATIONS

This application is a divisional of U.S. application Ser. No. 10/677,052, filed on Oct. 1, 2003, and claims the benefit of the filing date of U.S. Provisional Application No. 60/485,780 filed Jul. 9, 2003, both of which disclosures are incorporated herein by reference.

BACKGROUND OF THE INVENTION

The present invention relates to a method and apparatus for controlling emissions of NOx in the flue gas from systems such as combustion and fluid catalytic cracking unit (FCCU) operations. More particularly, it is an improved wet scrubbing method and apparatus that utilizes a relatively mist-free or water-droplet free ozone injection and retention zone.

The Clean Air Act Amendments were enacted in 1990 to regulate and reduce the amount of harmful pollutants released into the atmosphere. The Clean Air Act places strict guidelines on the amount of pollutants present in discharged flue gases from combustion sources and chemical plants. As a result, industries seek to implement efficient, but cost-effective systems and methods for controlling the release of harmful pollutants.

Nitrogen oxides (NOx) and sulfur oxides (SOx) are primary combustion pollutants targeted for reduction by the Clean Air Act. Various treatment processes and methods have been developed to reduce NOx in a flue gas. NOx reduction technologies employed for reducing the NOx concentration in the flue gas were typically either selective catalytic reduction (SCR) or non-catalytic reduction (SNCR) using ammonia or urea to convert the NOx to elemental nitrogen.

In the SNCR process, ammonia reduces NOx present in the flue gas to nitrogen, without the presence of a catalytic substance. The ammonia is then oxidized to nitrogen and water. The SNCR process is significantly limited, however, by the fact that it requires a very high operational temperature, ranging from 800°-1200° C. Even at these high operational temperatures, the percentage of NOx reduction is limited to about 60% and lower in most cases.

The SCR process requires the presence of a catalytic converter during the contact between the flue gas and ammonia or ammonia precursor. The process can be carried out at temperatures significantly lower than the SNCR process, such as 250°-600° C. However, the SCR process also has limitations.

The SCR process is more costly than the SNCR process, as the catalyst deteriorates with age and requires replacement every 3-5 years. Additionally, the catalyst can convert some of the $SO_2$ present in the flue gas to $SO_3$, which may cause additional pollution concerns. Lastly, in certain applications the catalyst bed may trap particulate matter causing blinding of the catalyst and/or a build-up of flue-gas pressure drop. As a result, a particulate removal device such as an electrostatic precipitator often precedes SCR.

SUMMARY OF THE INVENTION

The present invention provides a wet scrubbing apparatus that is able to remove NOx from the flue gas emitted from combustion, FCCU and other operations. Accordingly, various wet scrubber assemblies and fluid catalytic cracking systems in accordance with the present invention are disclosed which are capable of achieving NOx removal in varying percentages.

In accordance with one aspect of the invention, there is an apparatus for controlling NOx emissions comprising a chamber having a wall surface and an interior; a flue gas entrance and a flue gas exit for a flue gas to enter and exit said interior of said chamber; a gas quenching zone in which the temperature of the gas can be lowered; an ozone injection and retention zone in said chamber; and a liquid spray zone including at least one spray nozzle for spraying a liquid towards the wall surface.

Preferably, the apparatus includes an ozone supply; an ozone injection nozzle to inject a predetermined amount of ozone into said ozone injection and retention zone; a liquid supply in the liquid spray zone; a gas quenching liquid supply, and at least one gas quenching nozzle.

Preferably, in this aspect of the invention, the liquid spray zone is located above the ozone injection and retention zone, and the flue gas entrance is located below the liquid spray zone.

Alternatively, the liquid spray zone of the apparatus is located below the ozone injection and retention zone, and the flue gas entrance and the gas quenching zone are located above the liquid spray zone.

The liquid preferably comprises a calcium, magnesium, or sodium reagent.

The apparatus may have a height ranging from 50-120 feet tall, and a diameter ranging from 1-50 feet. It may include 3 or more spray nozzles depending upon the size of the apparatus.

The ozone to NOx ratio may range from 0.5-3.5. The ozone injection and retention zone may have a length that is sufficient to permit a flue gas traveling through the ozone injection and retention zone a residence time ranging from 0.5-10 seconds. Alternatively, the length of the ozone injection and retention zone may be sufficient to permit the flue gas to have a residence time of about 3-7 seconds in the ozone injection and retention zone.

The apparatus has a liquid to gas ratio ranging from 5-80 gallons per 1000 $feet^3$ of gas flow.

The flue gas may travel through the apparatus at a rate ranging from 3-26 feet/second.

Preferably, the flue gas exit has NOx emissions less than or equal to 50 ppmdv.

The apparatus may exhibit percentage of a NOx removal that is greater than about 30%, or alternatively, greater than about 50%. It may also have a rate of about 90% or greater. It may also be in the 70%-80% range.

The liquid supply may include a liquid comprising a chemical and water solution, and the liquid has a pH ranging from 5.5-7.5 pH.

The apparatus may quench the flue gas to a temperature between 120°-180° F., or below 200° F. in the gas quenching zone. Alternatively, it could be quenched to below 250° F.

In accordance with another aspect of the invention, a method comprises permitting flue gas to enter the interior of a chamber; quenching flue gas to lower the temperature of the flue gas; injecting ozone into the interior of the chamber; and spraying a liquid towards the walls of the chamber to capture reaction products of the oxidation process.

In accordance with this aspect of the invention, the liquid may include a sodium, calcium, or magnesium reagent.

In accordance with this aspect of the invention, the injection of ozone into the interior of the chamber may occur below the spraying of a liquid, and the entrance of a flue gas may be below the spraying of the liquid.

In accordance with this aspect of the invention, the spraying of a liquid may include injecting a liquid through more than 3 spray nozzles.

In accordance with this aspect of the invention, an ozone to NOx ratio may be maintained in a range from 0.5-3.5 in the chamber.

In accordance with this aspect of the invention, the flue gas may be allowed to maintain a retention time ranging from 0.5-10 seconds after the step of injecting ozone into the interior of the chamber.

In accordance with this aspect of the invention, the flue gas may be permitted to have a residence time of at least 3 seconds after injecting ozone into the interior of the chamber.

In accordance with this aspect of the invention, a liquid to gas ratio may be maintained in the system that is between 5-80 gallons per 1000 feet$^3$ of gas flow.

In accordance with this aspect of the invention, the flue gas may be allowed to travel through the apparatus at a rate of 3-26 feet per second.

In accordance with this aspect of the invention, the NOx emissions may be less than 40 ppmdv.

The apparatus may achieve a percentage of NOx removal that is greater than about 30%, or alternatively, greater than about 50%. It may also have a rate of about 90% or greater. It may also be in the 70%-80% range.

In accordance with this aspect of the invention, the flue gas may be quenched to a temperature of between 120-180° F., or below 200° F. Alternatively, it may be quenched to below 250° F.

In accordance with this aspect of the invention, the quenching of the flue gas may occur at the entrance into the interior of the chamber, and may include spraying liquid through the gas as it enters the chamber.

In accordance with another aspect of the present invention, a method of controlling NOx emissions includes introducing a flue gas into a chamber; quenching flue gas; injecting ozone into an ozone injection and retention zone in the interior of the chamber; spraying a liquid into the chamber; and maintaining a substantially droplet-free chamber interior in the vicinity of the ozone injection and retention zone.

In accordance with this aspect of the invention, the step of injecting ozone into the interior of the chamber may occur prior to spraying a liquid.

In accordance with this aspect of the invention, liquid may be sprayed through 3 or more spray nozzles.

In accordance with this aspect of the invention, the ozone to NOx ratio ranging from 0.5-3.5 may be maintained in the chamber.

In accordance with this aspect of the invention, flue gas may be allowed to maintain a retention time ranging from 0.5-10 seconds after the step of injecting ozone into the interior of the chamber.

In accordance with this aspect of the invention, flue gas may be permitted to have a residence time of at least 5 seconds after injecting ozone into the interior of the chamber.

In accordance with this aspect of the invention, a liquid to gas ratio may be maintained in the system between 5-80 gallons per 1000 feet$^3$ of gas flow.

In accordance with this aspect of the invention, the flue gas may be allowed to travel through the apparatus at a rate of from 3-26 feet/second.

In accordance with this aspect of the invention, NOx emissions are preferably less than 50 ppmdv.

In accordance with this aspect of the invention, the percentage of NOx removal may be greater than or equal to 50%.

In accordance with this aspect of the invention, the flue gas may be quenched to a temperature of between 140-160° F.

In accordance with another aspect of the invention, a combustion system comprises a boiler; an apparatus for controlling NOx emissions comprising a chamber having a wall surface and an interior; a flue gas entrance and a flue gas exit for a flue gas to enter and exit said interior of said chamber; a gas quenching zone in which the temperature of the gas can be lowered; an ozone injection and retention zone in said chamber; and a liquid spray zone including at least one spray nozzle for spraying a liquid towards the wall surface.

Preferably, the apparatus includes an ozone supply; an ozone injection nozzle to inject a predetermined amount of ozone into the ozone injection and retention zone; a liquid supply in said liquid spray zone; a gas quenching liquid supply, and at least one gas quenching nozzle.

Preferably, in this aspect of the invention, the liquid spray zone may be located above the ozone injection and retention zone, and the flue gas entrance may be located below the liquid spray zone.

Alternatively, the liquid spray zone of the apparatus may be located below the ozone injection and retention zone, and the flue gas entrance and the gas quenching zone are located above the liquid spray zone.

The liquid preferably comprises a calcium, magnesium, or sodium reagent.

Preferably, the apparatus may have a height ranging from 50-120 feet tall, a diameter ranging from 1-50 feet, an ozone injection and retention zone having a length that is sufficient to permit a flue gas traveling through the ozone injection and retention zone a residence time ranging from 0.5-10 seconds, and 3 or more spray nozzles dispersed in the liquid spray zone.

The length of the ozone and retention zone may be sufficient to permit the flue gas to have a residence time of about 3-7 seconds in the ozone injection and retention zone.

The ozone to NOx ratio may range from 0.5-3.5.

The liquid supply may include a liquid comprising a chemical and water solution, may have a pH ranging from 5.5-7.5 pH, and the apparatus may have a liquid to gas ratio ranging from 5-80 gallons per 1000 feet$^3$ of gas flow.

The flue gas may travel through the apparatus at a rate ranging from 3-26 feet/second, the flue gas exit has NOx emissions less than or equal to 50 ppmdv, and the apparatus may have a percentage of NOx removal of 30% or higher.

The flue gas is quenched to a temperature below 200° F. in the gas quenching zone.

The combustion system further comprises a stack.

These and other features and characteristics of the present invention will be apparent from the following detailed description of preferred embodiments which should be read in light of the accompanying drawings in which corresponding reference numbers refer to corresponding parts throughout the several views.

DETAILED DESCRIPTION

Figure 1:
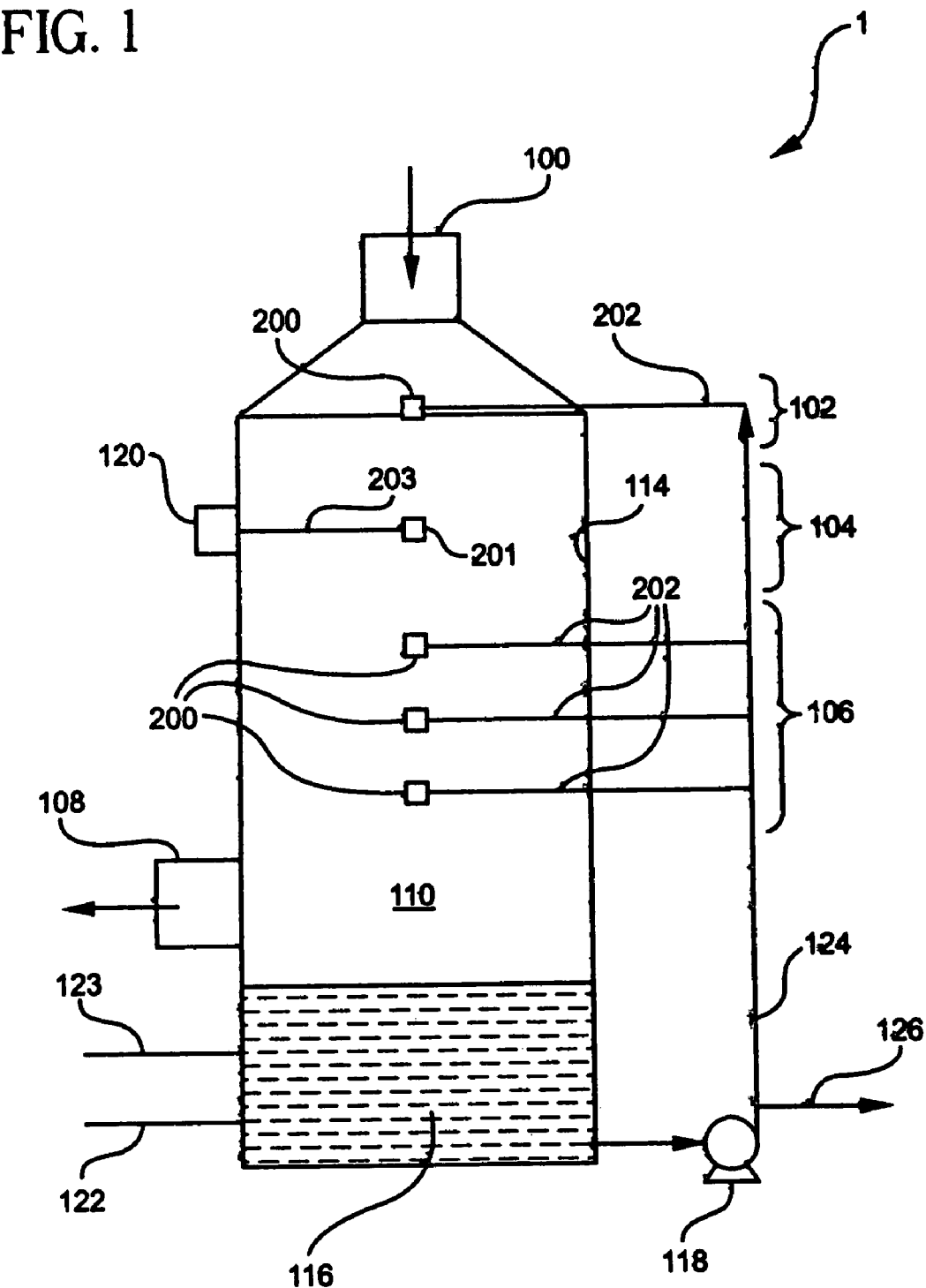
FIG. 1 is a vertical view of downflow wet scrubbing apparatus according to the present invention.

The present invention is generally directed to a wet scrubbing apparatus, such as the wet scrubber 1 shown in FIG. 1, and a method of reducing NOx emissions using the wet scrubbing apparatus of the present invention. It should be appreciated that the disclosure in U.S. Provisional Application No. 60/485,780 is fully incorporated herein by reference.

Referring to FIG. 1, the wet scrubber 1 is preferably a tall cylindrical tower and comprises a flue gas inlet 100, a gas quenching zone 102 in which the flue gas is quenched, an ozone injection and retention zone 104, a liquid spray zone 106, several layers of spray nozzles 200 located in the gas quenching zone 102 and liquid spray zone 106, and a flue gas exit 108. The diameter of the tower itself may range from 1.5-50 feet and its height may range from 5 to 120 feet.

High percentages of NOx removal from flue gas emitted from FCCU systems or similar systems can be achieved using the wet scrubber of the present invention. Injection of ozone into flue gas during wet scrubbing operations, which follow FCCU or other systems, can reduce the levels of NOx in the exhaust gas stream. Ozone can be injected using LoTOx™, a BOC Group, Inc. NOx reduction technology utilizing ozone to oxidize the NOx present in the flue gas. (LoTOx™ is a trademark owned by The BOC Group, Inc. The LoTOx™ system is available exclusively for FCCU applications from BELCO® under license from BOC.) In one preferred embodiment, as shown in FIG. 1, the ozone is injected into a wet scrubbing device, such as a downflow spray type BELCO® EDV® scrubber.

The process employs ozone to oxidize both NO and $NO_2$ to $N_2O_5$, then to nitric acid, $HNO_3$. The nitric acid formed in the process is then neutralized with the dilute caustic present in the scrubbing liquid to form sodium nitrate in the scrubber.

Both NO and $NO_2$ present in the flue gas are converted to $N_2O_5$ when they react with ozone. $N_2O_5$ is very soluble in water and forms nitric acid with the moisture present in the flue gas stream. The major reactions involved are:

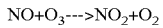

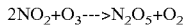

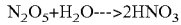

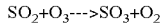

It should be appreciated that the reaction of $SO_2$ with ozone is very slow as compared to the reaction of NO with ozone. Therefore, the formation of $SO_3$ due to the presence of ozone is very small.

Referring back to FIG. 1, as indicated by the arrow, the overall wet scrubbing process begins when gas enters the top of the wet scrubber 1 through the flue gas inlet 100. The gas then travels through a gas quenching zone 102, wherein the flue gas is quenched to its saturation temperature by at least one spray nozzle 200 which emits scrubbing liquids. Due to the design of the spray nozzles, the scrubbing liquids are directed towards the interior walls 114 of the chamber interior 110 such that they do not enter or fall into the central portion of the chamber interior 110. After quenching, the gas then passes through the ozone injection and retention zone 104 where ozone is injected into the chamber interior 110. The gas then travels through the chamber interior 110 for a predetermined retention time without the presence of liquid droplets from the scrubbing liquids sprayed in the gas quenching zone 102. The gas is then again sprayed with scrubbing liquids from spray nozzles 200 in the liquid spray zone 106, after which the flue gas exits the wet scrubber 1 through the flue gas exit 108.

The flue gas inlet 100 is typically a ductwork connection made of stainless steel that connects the boiler (not shown) to the wet scrubber 1. The velocity of the flue gas flow inside the wet scrubber 1 has a preferred velocity of 10-15 feet/second, although the system is operable when the velocity falls in the range between about 3 and 26 feet/second. Due to combustion of the gas prior to entry into the wet scrubber 1, the flue gas entering the wet scrubber 1 attains temperatures greater than 450° F., and contains harmful combustion byproducts such as sulfur oxides, nitrogen oxides and particulate matter. In order for the LoTOx™ oxidation process to oxidize these pollutants, the operational temperatures should occur at 275° F., and preferably, less than 250° F. If appropriate operational temperatures are not achieved, the subsequent injection of ozone in the ozone injection and retention zone 104 is ineffective. Ozone decomposes at temperatures greater than 250° F., thus ozone injection should occur at temperatures preferably below 250° F. to be effective. Accordingly, once the flue gas enters the wet scrubber 1, the gas must be cooled or quenched.

Cooling or quenching of the flue gas occurs in gas quenching zone 102 where the flue gas is preferably quenched to at least its adiabatic saturation temperature typically ranging from 120°-180° F., or more preferably 140°-160° F., although the system is still operable when the gas is quenched to temperatures ranging from 100-250° F. Cooling or quenching the flue gas with partial quenching is not successful for flue gas following FCCU application. This is because partial quenching or cooling of the flue gas is difficult to control when applied to the flue gas from FCCU. Thus, complete quenching of the flue gas to its adiabatic saturation temperature typically between 120°-180° F., or more preferably 140°-160° F., permits for the subsequent injection of ozone in the ozone injection and retention zone 104 without fear of ozone depletion.

In one important feature of the present invention, and as will be described in more detail herein, the gas quenching zone 102 preferably contains at least one EDV® LAB-G spray nozzle, or similar type of nozzle that is capable of spraying scrubbing liquids towards the interior walls 114 of the chamber interior 110. Additionally, such nozzles are preferably able to control droplet size.

Figure 1A:
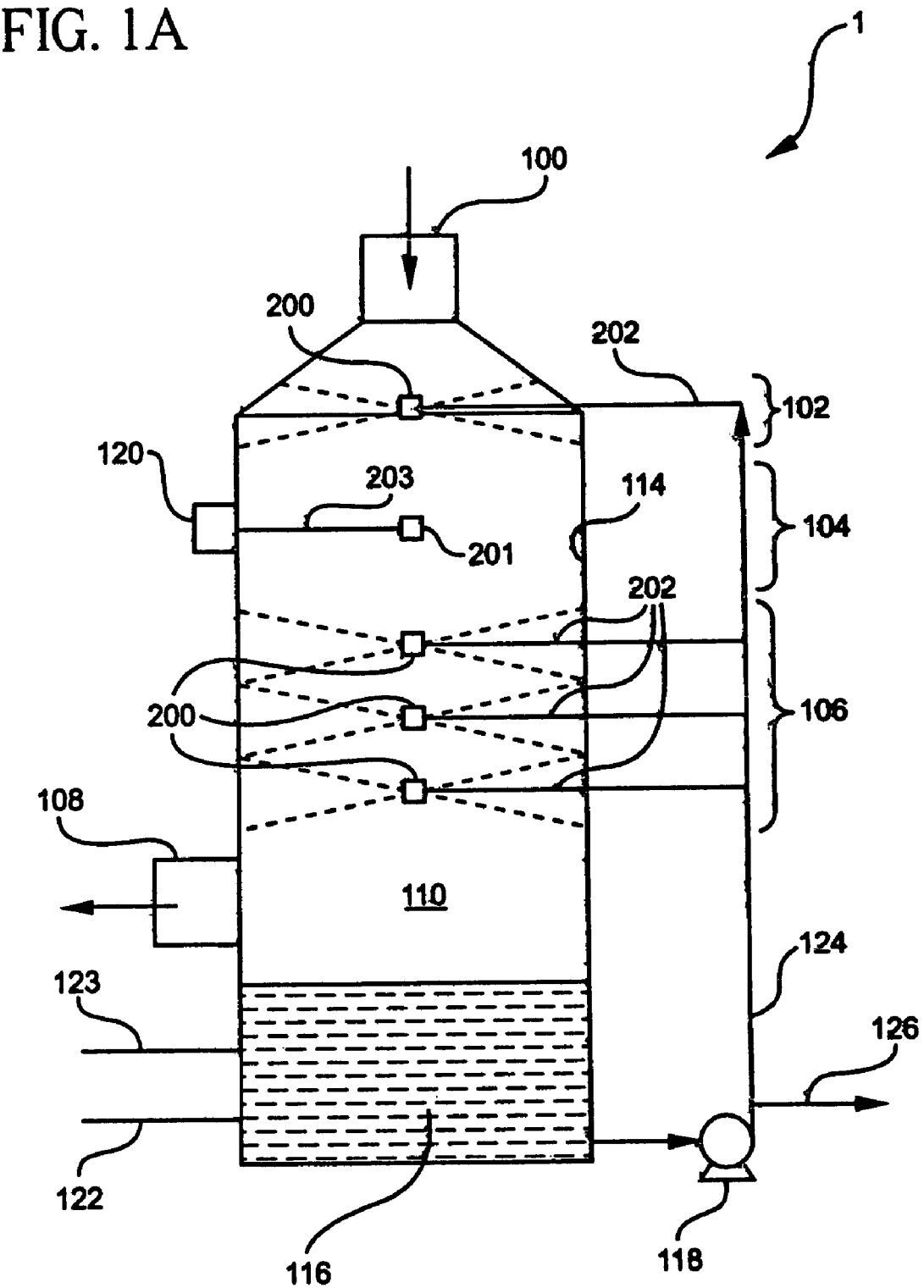
FIG. 1A is a vertical view of downflow wet scrubbing apparatus according to the present invention demonstrating the directional flow of water from a spray nozzle.

As shown in FIG. 1A wherein the spray nozzles 200 are shown emitting scrubbing liquids, due to the ability of the spray nozzles 200 to direct all scrubbing liquids towards the interior walls 114, there are no water droplets or substantially no water droplets falling through the center of the chamber interior 110. Instead, a curtain of water directed towards the walls is created. This differs from other wet scrubbers, which typically direct scrubbing liquids through the center of the wet scrubbing chamber, such that the scrubbing liquids occupy the center volume of the chamber. The present invention therefore prevents or minimizes the presence of water ($H_2O$) in the scrubbing liquids from interfering with the oxidation reactions that will occur in the ozone injection and retention zone 104. Minimizing the presence of scrubbing liquid in the ozone injection and retention zone 104 increases the availability of ozone for oxidation of NOx compounds by ozone. Thus, instead of water droplets falling through the center of the chamber interior 110, water droplets continually drip or run down the sides of the interior walls 114, and are collected in a reservoir 116 located at the bottom of the wet scrubber 1.

Due to the design of the spray nozzles, the main portion of the wet scrubbing apparatus is an open tower or chamber. Additionally, the open chamber does not utilize chimney trays or other devices that can segregate or define a physical boundary between the respective wet scrubbing zones. An open chamber is advantageous for treating gas from a fluid catalytic cracking unit or other applications requiring gas cleaning operations because commonly used chimney trays will tend to plug with particulate causing further maintenance and resulting in unscheduled downtime in the fluid catalytic-cracking unit. Eliminating the chimney trays or other segregating devices also allows for an open volume at the mist-free ozone injection and retention zone for ozone to completely oxidize NOx. Furthermore, this arrangement helps to reduce, if not eliminate, the presence of liquid droplets in the ozone injection and retention zone that may interfere with the oxidation process.

Referring back to FIG. 1, once the flue gas has been quenched, the gas then passes into the ozone injection and retention zone 104. Ozone is injected into the system preferably from an ozone generator 120 that feeds the ozone through a pipe 203, and into an ozone injection nozzle 201, which then distributes the ozone. Additionally, there may be additional injection nozzles 201 located along the pipe to permit injection of ozone at various locations.

The ozone is injected directly into the interior of the chamber in this embodiment. In another embodiment, such as the upflow apparatus in FIG. 7 which will be described in greater detail herein, the ozone may be injected in the flue gas entrance 100 immediately after the gas quenching zone 102 and just before entering the chamber.

As discussed, it is desired to inject ozone at a temperature that will not cause ozone depletion. To avoid ozone depletion by ensuring that the ozone is injected at an appropriate temperature (i.e. a temperature at or below 250° F. and more specifically at the aforementioned temperatures and temperature ranges), a thermocouple can be provided adjacent to the ozone injection point.

After the flue gas has traveled through the ozone injection and retention zone 104, it travels through the liquid spray zone 106. EDV® LAB-G nozzles 200, or similar nozzles able to direct water towards the walls of the wet scrubbing apparatus, are preferably utilized in the liquid spray zone 106 to disperse the scrubbing liquids. In one preferred embodiment, there are three levels of nozzles 200 feeding several streams of scrubbing liquid into the flue gas. Similar to the gas quenching zone 102, the number and layers of nozzles 200 will depend on the system requirements, such as the diameter and height of the wet scrubbing apparatus. Once the flue gas has been treated, it exits the wet scrubber 1 through the flue gas exit 108 and is exhausted through a stack (not shown).

Figure 2:
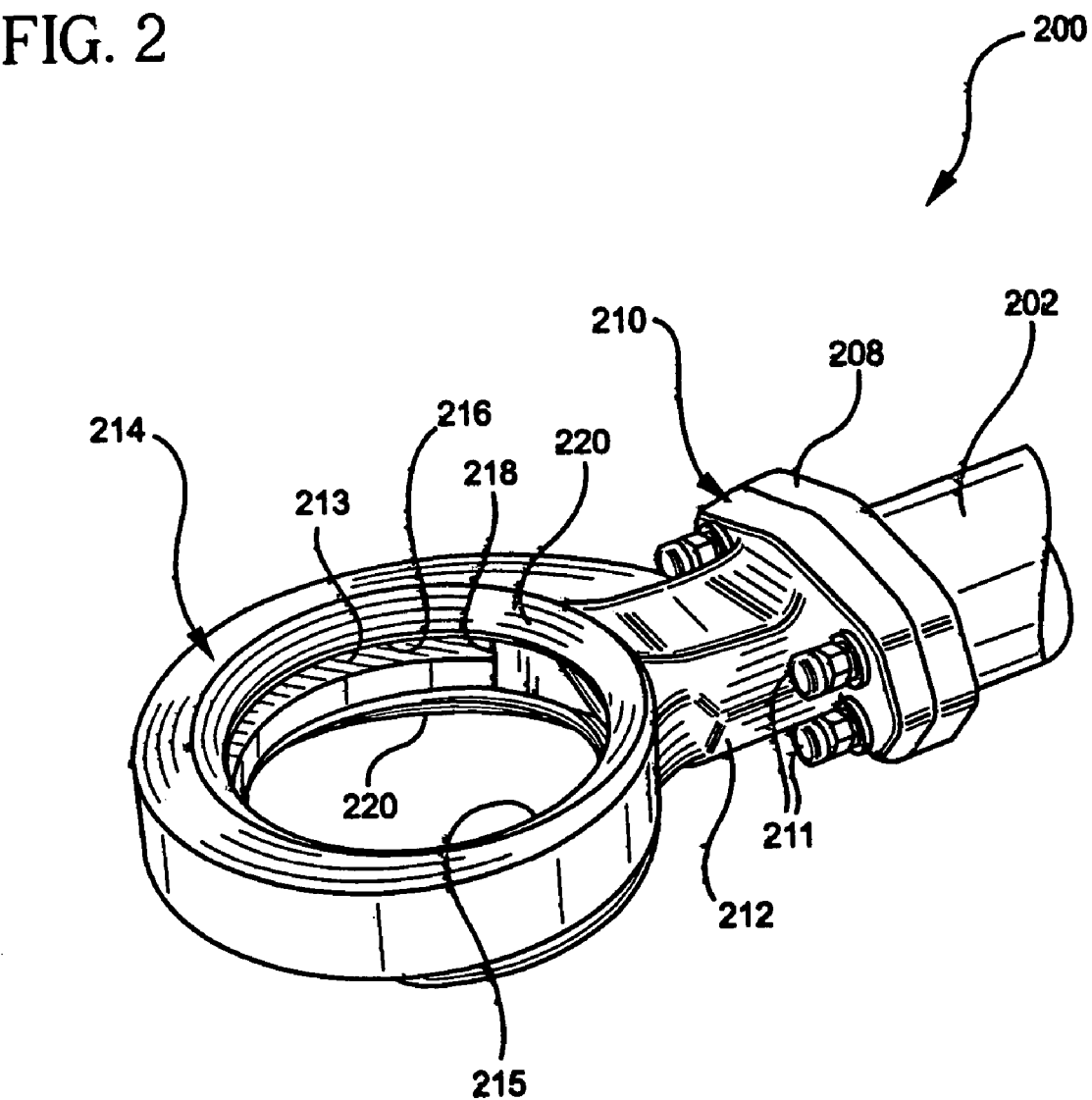
FIG. 2 is a perspective view of a spray nozzle shown in FIGS. 1 and 1A.

FIG. 2 depicts the EDV® LAB-G spray nozzle 200 provided in the liquid spray zone 106, and/or gas quenching zone. Of course, any suitable spray nozzle can be used in accordance with the present invention to create a droplet free or substantially droplet free ozone injection and retention zones. The spray nozzle is circular, and has a mating region 210, a hollow neck 212, and a circular head 214. The spray nozzle is attached to the pipe 202 where the mating region 210 meets a complementary hose mating region 208 of the pipe 202. Screws 211 connect the pipe 202 and spray nozzle 200 together.

The spray nozzle 200 has a channel 216 located on the interior of the spray nozzle 200. The scrubbing liquid travels through the pipe 202, through the hollow neck 212 and through a passageway 218 that directs the scrubbing liquid into a channel 216. Channel 216 continues throughout the circumference of the spray nozzle to allow scrubbing liquids to be projected circumferentially outward over the rim 220 which extends above and below the hollow neck 212. The beginning of the channel 216 has a deep region 213 that transitions into a shallow region 215 enabling the scrubbing liquid to radially project.

Figure 3:
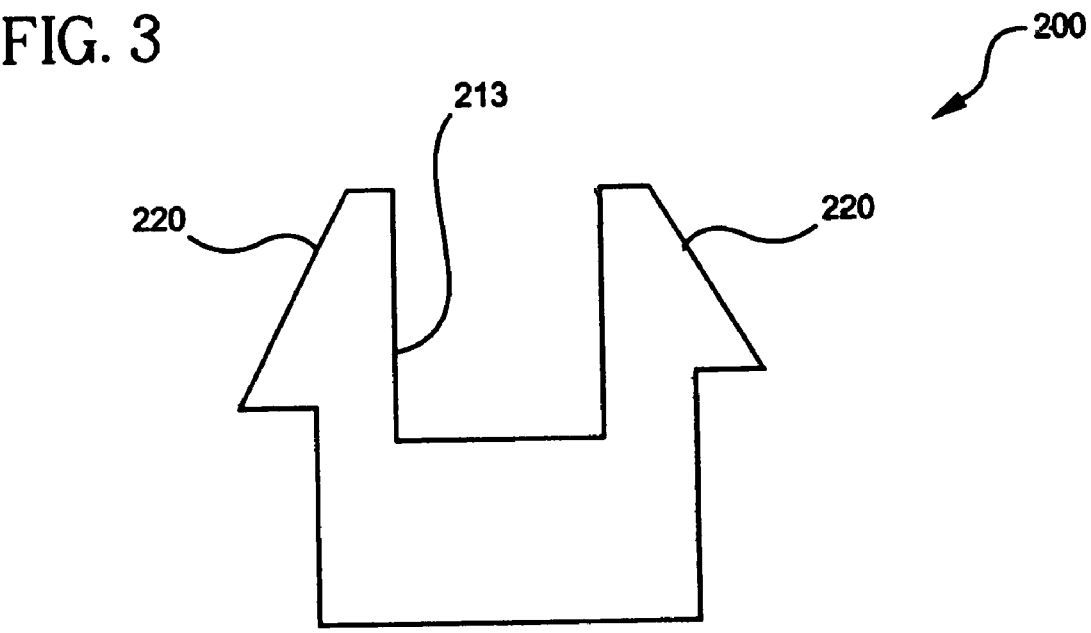
FIGS. 3 and 4 are cross-sectional views of the spray nozzle shown in FIGS. 1-3
Figure 4:
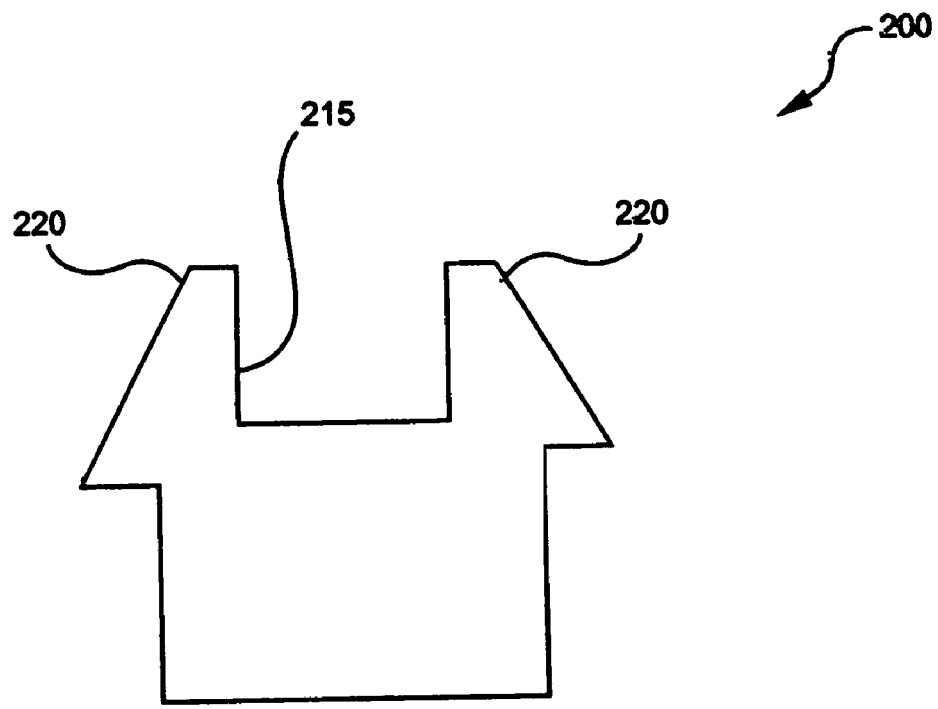

Referring to FIGS. 3 and 4, a cross section of the spray nozzle 200 shows where liquid will pass in the shallow region 215 and deep region 213. The high velocity of the scrubbing liquid pumped through spray nozzles 200 ensures that the scrubbing liquid is projected radially outwards from the spray nozzle 200, so as to maintain a droplet free zone or substantially droplet free zone in the chamber interior 110. Accordingly, despite the distance that the spray nozzle 200 may be from the interior wall 114 of the chamber interior 110, water is always directed towards the interior walls 114.

Depending on the diameter of the chamber interior 110 of the wet scrubber 1, the EDV® LAB-G spray nozzles 200 are typically located at or close to the center of the chamber interior 110 when a single nozzle is used at each level. When several nozzles are used at each level, the nozzles may be placed somewhere between the center of the chamber 110 and the interior wall 114. The nozzles 200 are preferably located at the end of a pipe 202 that feeds scrubbing liquid into the nozzles 200 from a liquid supply. The number of nozzles and layers of nozzles are a function of the size of the wet scrubber 1, the amount of liquid spray required to be pumped into each of the nozzles 200, and the temperature of the flue gas entering the wet scrubber 110.

Figure 5:
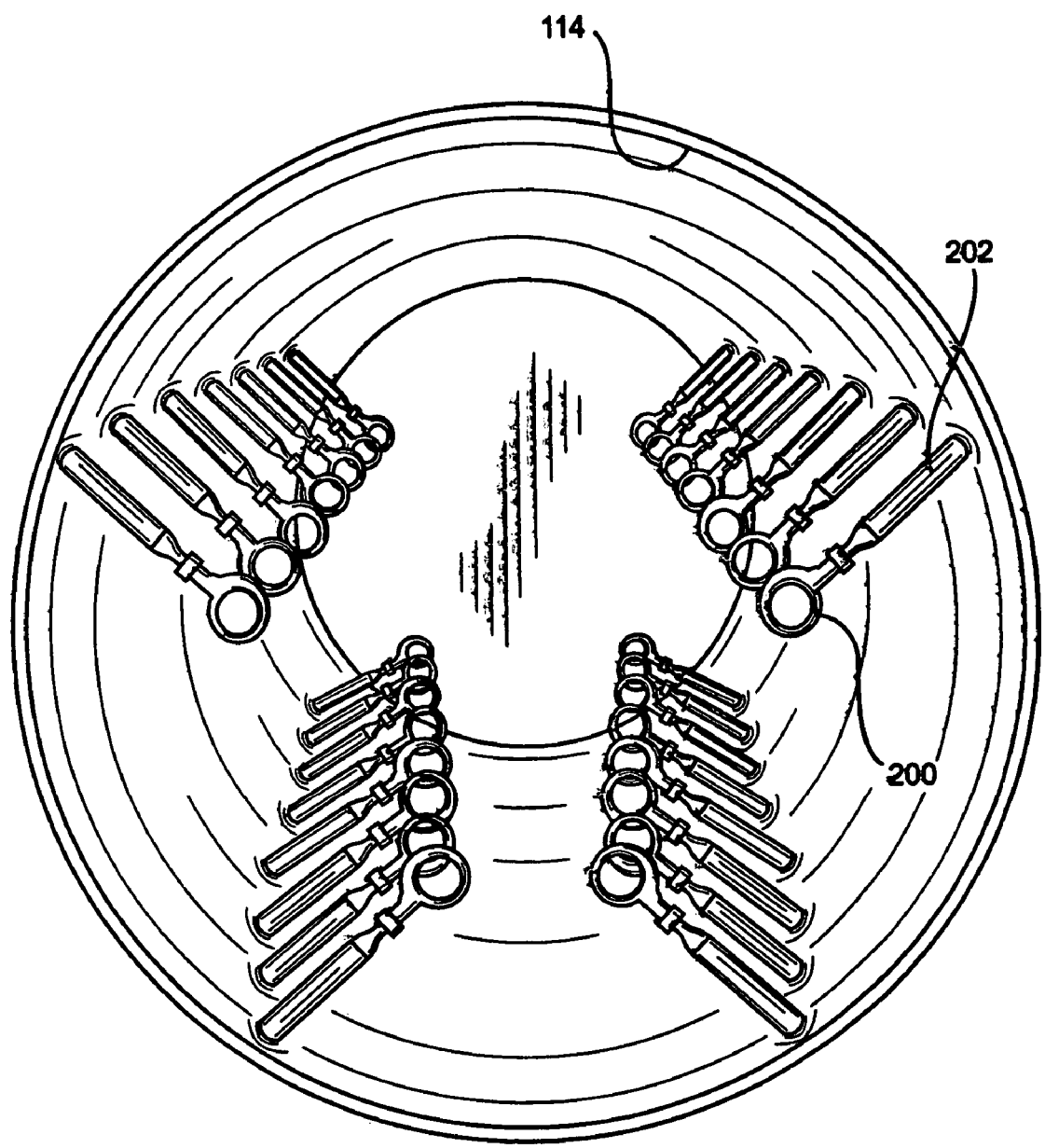
FIG. 5 is a side elevational view of multiple spray nozzles configured in a wet scrubbing chamber in accordance with an alternate embodiment of the present invention.

In a wet scrubber with a small diameter, the presence of one spray nozzle 200 at each level in the liquid spray in the gas quenching zone may be sufficient. Alternatively, (as shown in FIG. 5) in a wet scrubber with a diameter of much larger proportions, depending upon the nozzles used, it may be necessary to position the nozzles 200 much closer to the interior walls 114 of the chamber interior 110, (as opposed to the center of the chamber interior 110) to enable the positioning of more than one spray nozzle 200 in a given row. In the embodiment shown in FIG. 5, 4 spray nozzles are arranged in each of the 7 rows.

By way of example, in a typical chamber that is 24 feet in diameter and 80 feet in height, 30-100 spray nozzles are provided and dispersed throughout the gas quenching zone and liquid spray zone. Spray towers typically range from 1-50 feet in diameter, and the number of nozzles vary based on the size of the spray tower (or chamber) and other applicable parameters.

The length of the ozone injection and retention zone may be a function of the retention time desired. The theoretical retention time needed for the ozone to react with flue gas is calculated based on the ratio of volume to flow rate (Volume/Flow Rate). The reaction time typically runs from 0.5-10 seconds depending on how much NOx is to be removed and how much residual ozone can be tolerated. It should be appreciated that the retention time based on the ratio of volume to flow rate may vary slightly, given the fact that the flow rate is not totally uniform. The preferred ozone residence time is 3-7 seconds, although as indicated, a residence time of at least 0.5 seconds, or in the range of 0.5 to 10 seconds is also contemplated.

Either pure oxygen or air can be utilized as the source of the oxygen for the ozone generator. The quantity of ozone introduced into the system is determined based on the available retention time of the ozone inside the scrubber and the system performance required.

A WEDECO Model SG-40 is an example of a preferred ozone generator 120 that can be used in the wet scrubbing apparatus 1. The generator is capable of producing at least 40 pounds per day of ozone at 10% wt concentration using oxygen as the feed gas. The ozone generator includes a closed loop chiller to absorb the heat generated in the ozone production. An ozone concentration of 3.5% by weight in air can be achieved if the ozone generation operates at its maximum capacity. It should be appreciated, however, that any ozone generator or device for supplying ozone to the wet scrubbing apparatus may be used.

Figure 6:
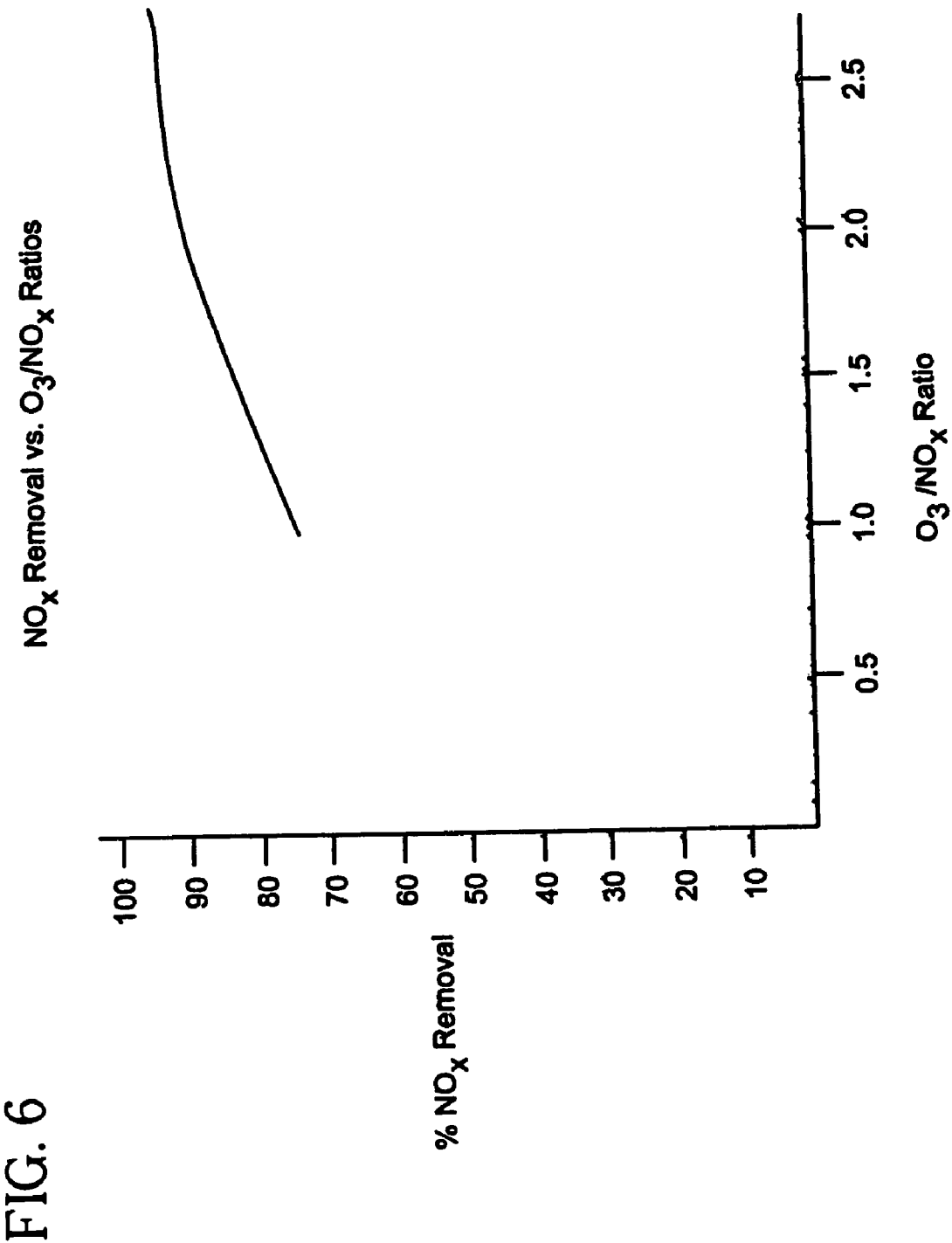
FIG. 6 is a chart plotting percentage of NOx removal versus ozone/NOx ratios.

The feed rate of ozone is preferably operated such that an ozone to NOx ratio between 1.2 to 2.2 is maintained in the system. Achieving an ozone to NOx ratio in this range is possible utilizing the wet scrubbing process according to the present invention, and when operating at its optimum capacity may be capable of achieving 90% or greater NOx removal. Depending upon the application requirements and available operating costs, the removal of NOx can be varied. Thus, 30% or 50% removal may be achieved if desired. It is expected that removal of NOx might typically be in the approximate range of 70%-80%, although the system is capable of achieving percentages of NOx removal that are 90% or more. Such percentages of NOx removal are improvements over prior art wet scrubbers, especially given the cost effectiveness of maintaining the system. It should be appreciated, that the system is still capable of achieving a high percentage of NOx removal where an ozone/NOx ratio of 0.5 to 3.5 is maintained in the system. By way of example, FIG. 6 is a chart demonstrating the percentage of NOx Removal versus the ozone/NOx ratio is shown at a constant temperature and residence time. As indicated by the curve, with higher the $O_3$ to NOx ratio, a greater percentage of NOx removal is achieved.

It is preferred that NOx emissions from the wet scrubber 1 are less than 50 ppmdv, in order to comply with federal air quality standards defined in the Clean Air Act, as well as regional air quality standards. Such emissions result in a percentage of NOx removal that is greater than or equal to 40%. NOx reduction by ozone injection can achieve percentages of NOx removal that are greater than 90% when the NOx inlet concentration is at least 75 ppmdv with retention time of 1 to 7.5 seconds. Injection of ozone in the wet scrubbing apparatus of the present invention can reduce the NOx level in the exhaust gas stream to less than 10 ppmdv at the ozone retention time from 1 to 7.5 seconds with a certain ozone to NOx ratio. The greater the retention time, the less the ozone to NOx ratio is required. For gases with lower NOx inlet concentrations such as less than 45 ppmdv, it will require a greater ozone to NOx ratio (at least 3:1) to achieve percentages of NOx removal that are greater than 90% when the retention time ranges from 1 to 7.5 seconds, which may not be economical. The excess amount of the ozone introduced into the system may also create higher residual ozone in the exhaust gas stream.

The scrubbing liquid used in the wet scrubber 1 to quench the gas and spray of the flue gas is a combination of water make-up, which is initially pumped through line 123, and chemical make-up, such as diluted caustic feed, which is pumped through line 122.

The scrubbing liquids used in the wet scrubber capture the reaction products of the oxidation reactions and recover the sulfur oxides and particulate. NOx present in the flue gas is able to be oxidized to di-nitrogen penta-oxide and then be converted to nitric acid. Acid gases and reaction products generated from the reactions that occur in the chamber are then neutralized with the dilute caustic contained in the scrubbing liquid to form soluble sodium nitrate.

The scrubbing liquid is continuously circulated through the spray nozzles and a return loop. A pump 118 recirculates the scrubbing liquid through the line 124 leading back to the spray nozzles 200 in the gas quenching zone 102 and the spray nozzles 200 in the liquid spray zone 106. It should be appreciated that for convenience, the same liquid supply may be used in the liquid spray zone and gas quenching zone. However, a different liquid supply and/or scrubbing liquid may be used in the gas quenching zone and liquid spray zone, such that it is unnecessary to recirculate the liquid through both zones. Also, the nozzles for the quenching zone and the liquid spray zone may be different. A liquid to gas ratio is maintained in the system that is preferably about 20-40 gallons per 1000 feet$^3$ of gas flow, although the system is operable at range between 5 and 80 gallons per 1000 feet$^3$.

The flow rate of the diluted caustic feed is based on pH of the liquid inside of the scrubber. The chemical make-up flow rate is preferably operated so that the scrubbing liquid has a set pH of 7.0, however the scrubbing liquid can still be utilized if it has a set value in the range of 5.5-7.5 pH.

The amount of water make-up to the scrubber is a predetermined value to compensate for the water requirement in the evaporation process and to maintain the desirable liquid level in the reservoir 116. Additionally, emergency water is also provided to the scrubber to keep the liquid level during the failure of pump 118, an upset in FCCU operations or the operations of another application for the scrubbing apparatus, or where there is an excess amount of particulate building up in the reservoir.

The flow rate of the scrubbing liquid through the spray nozzles 200 in the gas quenching zone 102 can be operated with a set value so that it is 3 to 20 times the theoretical quench water required to cool the flue gas to its adiabatic saturation temperature. The preferred liquid flow rate is 6 to 10 times of the theoretical values.

The flow to each spray nozzle can be measured by an individual flow meter located on each leg. A small slip stream can constantly be withdrawn from the reservoir to maintain a desired liquid level and solid concentration in the reservoir 116. Fresh water can also be continually fed to the wet scrubber reservoir 116 to maintain a desired level of the scrubbing liquid. One level probe is typically inserted into the wet scrubber reservoir 116 for controlling the introduction of make-up water.

A line 126 carries the scrubbing liquid to a purge treatment unit (not shown) in order to regulate the concentration of components in the scrubbing liquid. The flow rate of the scrubbing liquid through line 126 is set so that the concentration of total suspended solid and total dissolved solid in the scrubbing liquid is preferably 0.4-0.5% and 8-12% respectively, although the wet scrubbing system is still operational where the ratio is 0.2-1.5% and 4-15% respectively.

To capture the residual ozone in the exhaust gas stream, a certain concentration of an ozone scavenger, such as sodium bisulfite and/or sodium sulfite can be present in the scrubbing liquid. This typically comes from the absorption of $SO_2$ in the gas stream sprayed.

The flow rate of the blowdown stream 126 of the wet scrubbing apparatus can be operated with a set value so that the concentration of total suspended solid and total dissolved solid in the scrubbing liquid is about 0.2-1.5% and about 4-16%, respectively, and is preferably in the concentration range of about 0.4-0.5% and about 8-12%, respectively.

Figure 7:
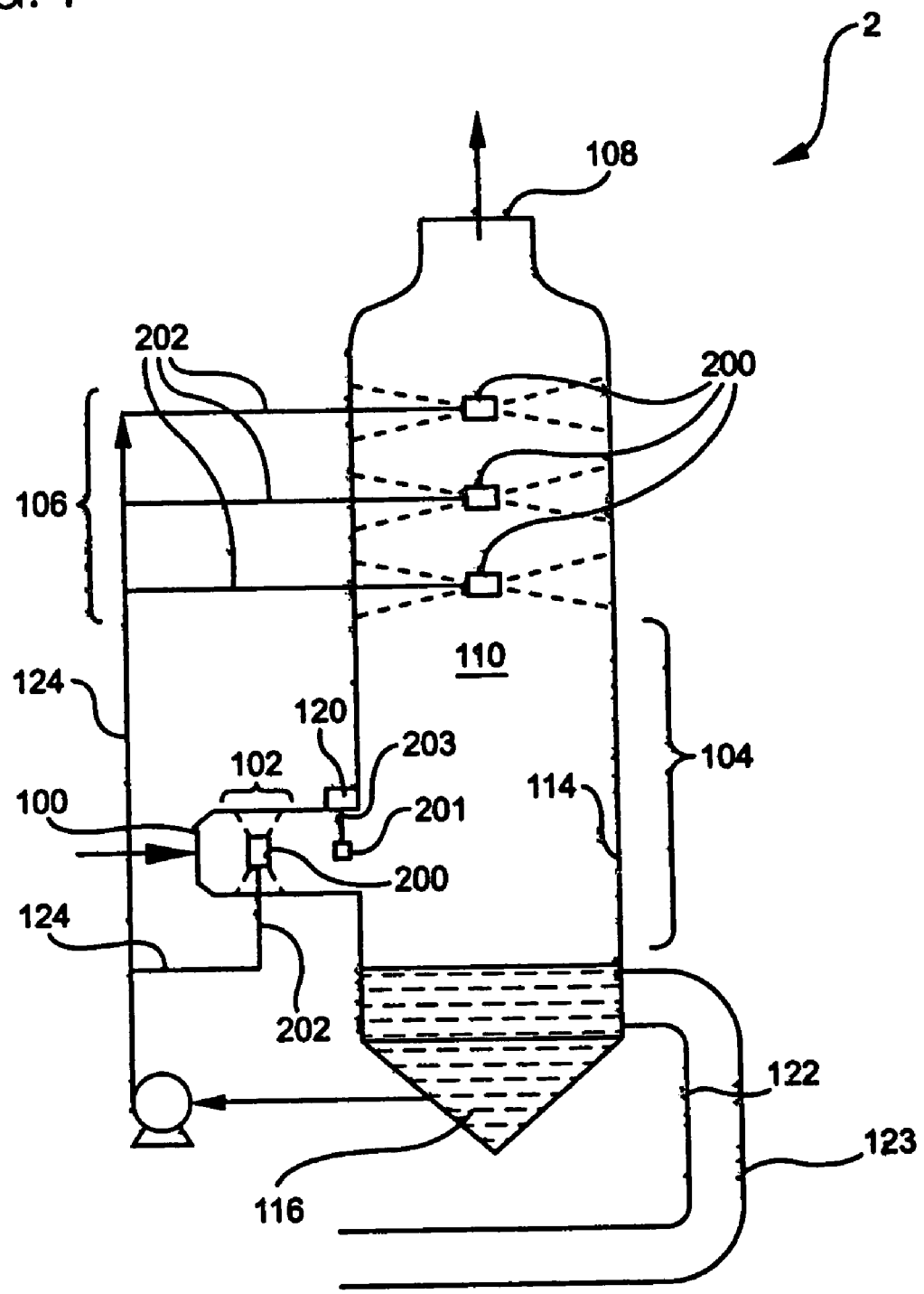
FIG. 7 is a vertical view of an upflow wet scrubbing apparatus according to the present invention.

Referring to FIG. 7, an alternative embodiment of the present invention is shown, wherein the upflow wet scrubbing process is closely related to the downflow wet scrubbing process of FIG. 1-1A. Given that the primary difference between the two embodiments is that the wet scrubber 2 operates in an upflow direction, the same reference numerals have been used to describe this embodiment. It should therefore be understood that the description of the components and operation of wet scrubber 1 are equally applicable to this embodiment.

In this alternative embodiment, flue gas enters the flue gas inlet 100, which is located towards the bottom of the wet scrubber 2. The flue gas travels through the flue gas inlet 100 into the gas quenching zone 102. EDV® LAB-G spray nozzles 200 are preferably utilized in the gas quenching zone 102, to quench the flue gas to its adiabatic saturation temperature. The nozzles 200 direct scrubbing liquids towards the walls of the flue gas inlet. After quenching, the flue gas travels through the ozone injection and retention zone 104. An ozone generator preferably injects ozone into the chamber interior 110 or at the entrance to the interior 110 where it travels upward within the ozone injection and retention zone. Thereafter, the flue gas travels a predetermined period of time up through the chamber interior 110. The flue gas then reaches the liquid spray zone 106 wherein several layers of EDV® LAB-G spray nozzles 200 emit scrubbing liquids towards the interior walls 114 of the wet scrubber 2. This prevents the liquids from falling through the center of the chamber interior and interfering with the flue gas as it travels through the ozone injection and retention zone 104. Afterwards, the flue gas exits the wet scrubber 2 through the flue gas exit.

Although the invention herein has been described with reference to particular embodiments, it is to be understood that these embodiments are merely illustrative of the principles and applications of the present invention. Moreover, although the embodiments and methods herein have been described in relation to the scrubbing or cleaning of gas emissions from combustion and fluid catalytic cracking operations, typically located after such operations, the apparatus and method of the present invention may be used in any applications wherein it is desired to remove particulates or byproducts in flue gas. It is to be appreciated that the present invention may take on various alternative orientations. It is therefore to be understood that numerous modifications may be made, and are encouraged to be made, to the illustrative and disclosed embodiments and that other arrangements may be devised without departing from the spirit and scope of the present invention as defined by the appended claims.

The invention claimed is:

1. An apparatus for controlling NOx emissions comprising:
   a chamber having a wall surface and an interior;
   a flue gas entrance and a flue gas exit for a flue gas to enter and exit said interior of said chamber;
   a gas quenching zone in which the temperature of the gas can be lowered;
   an ozone injection and retention zone in said chamber; and
   a liquid spray zone including at least one spray nozzle for spraying a liquid towards the wall surface so that a portion of said ozone injection and retention zone is substantially free of liquid droplets.

2. An apparatus according to claim 1, further including:
   an ozone supply;
   an ozone injection nozzle to inject a predetermined amount of ozone into said ozone injection and retention zone;
   a liquid supply in said liquid spray zone;
   a gas quenching liquid supply; and
   at least one gas quenching nozzle.

3. An apparatus according to claim 2, wherein said liquid spray zone is located above said ozone injection and retention zone, and said flue gas entrance is below said liquid spray zone.

4. An apparatus according to claim 2, wherein said liquid spray zone of said apparatus is located below said ozone injection and retention zone, and said flue gas entrance and said gas quenching zone are above said liquid spray zone.

5. An apparatus according to claim 2, wherein said liquid comprises a calcium, magnesium, or sodium reagent.

6. An apparatus according to claim 2, wherein said flue gas is quenched to a temperature of below 200° F. in said gas quenching zone.

7. An apparatus according to claim 2, wherein said gas quenching nozzle sprays a liquid towards the wall surface, so that a portion of said ozone injection and retention zone is substantially free of liquid droplets.

8. An apparatus for controlling NOx emissions comprising:
   a chamber having a wall surface and an interior;
   a flue gas entrance and a flue gas exit for a flue gas to enter and exit said interior of said chamber;
   a gas quenching zone in which the temperature of the gas can be lowered;
   an ozone injection and retention zone in said chamber; and
   a liquid spray zone in said chamber,
   said gas quenching zone including at least one spray nozzle for spraying a liquid towards the wall surface, so that a portion of said ozone injection and retention zone is substantially free of liquid droplets.

9. An apparatus according to claim 8, further including:
   an ozone supply;
   an ozone injection nozzle to inject a predetermined amount of ozone into said ozone injection and retention zone;
   a liquid supply in said liquid spray zone;
   a gas quenching liquid supply; and
   at least one gas quenching nozzle.

10. An apparatus according to claim 9, wherein said liquid spray zone is located above said ozone injection and retention zone, and said flue gas entrance is below said liquid spray zone.

11. An apparatus according to claim 9, wherein said liquid spray zone of said apparatus is located below said ozone injection and retention zone, and said flue gas entrance and said gas quenching zone are above said liquid spray zone.

12. An apparatus according to claim 9, wherein said flue gas is quenched to a temperature of below 200° F. in said gas quenching zone.

13. An apparatus according to claim 9, wherein said gas quenching nozzle sprays a liquid towards the wall surface, so that said ozone and injection and retention zone is substantially free of liquid droplets.

14. A combustion system comprising:
   a boiler; and
   an apparatus for controlling NOx emissions comprising:
   a chamber having a wall surface and an interior;
   a flue gas entrance and a flue gas exit for a flue gas to enter and exit said interior of said chamber;
   a gas quenching zone in which the temperature of the gas can be lowered;
   an ozone injection and retention zone in said chamber; and
   a liquid spray zone including at least one spray nozzle for spraying a liquid towards the wall surface so that a portion of said ozone injection and retention zone is substantially free of liquid droplets.

15. An apparatus according to claim 14, further including:
an ozone supply;
an ozone injection nozzle to inject a predetermined amount of ozone into said ozone injection and retention zone;
a liquid supply in said liquid spray zone;
a gas quenching liquid supply; and
at least one gas quenching nozzle.

16. An apparatus according to claim 15, wherein said liquid spray zone is located above said ozone injection and retention zone, and said flue gas entrance is below said liquid spray zone.

17. An apparatus according to claim 15, wherein said liquid spray zone of said apparatus is located below said ozone injection and retention zone, and said flue gas entrance and said gas quenching zone are above said liquid spray zone.

18. An apparatus according to claim 15, wherein said gas quenching nozzle sprays a liquid towards the wall surface, so that a portion of said ozone injection and retention zone is substantially free of liquid droplets.

19. A combustion system comprising:
a boiler; and
an apparatus for controlling NOx emissions comprising:
a chamber having a wall surface and an interior;
a flue gas entrance and a flue gas exit for a flue gas to enter and exit said interior of said chamber;
a gas quenching zone in which the temperature of the gas can be lowered;
an ozone injection and retention zone in said chamber; and
a liquid spray zone in said chamber,
said gas quenching zone including at least one spray nozzle for spraying a liquid towards the wall surface so that a portion of said ozone injection and retention zone is substantially free of liquid droplets.

20. An apparatus according to claim 2, wherein said apparatus has a height ranging from 50-120 feet, and a diameter ranging from 1-50 feet.

21. An apparatus according to claim 1, wherein said apparatus includes three spray nozzles.

22. An apparatus according to claim 2, wherein said apparatus has a liquid to gas ratio ranging from 5-80 gallons per 1000 feet$^3$ of gas flow.

23. An apparatus according to claim 2, wherein said flue gas travels through said apparatus at a rate ranging from 3-26 feet/second.

24. An apparatus according to claim 2, wherein said apparatus has a percentage of NOx removal greater than or equal to 50%.

25. An apparatus according to claim 2, wherein said liquid supply includes a liquid comprising a chemical and water solution, and said liquid has a pH ranging from 5.5-7.5 pH.

26. An apparatus according to claim 14, wherein said liquid comprises a calcium, magnesium, or sodium reagent.

27. An apparatus according to claim 14, wherein said apparatus has a height ranging from 50-120 feet tall and a diameter ranging from 1-50 feet.

28. An apparatus according to claim 15, wherein said apparatus has a liquid to gas ratio ranging from 5-80 gallons per 1000 feet$^3$ of gas flow, and said liquid supply includes a liquid comprising a chemical and water solution and having a pH ranging from 5.5-7.5 pH.

29. An apparatus according to claim 14, wherein said flue gas travels through said apparatus at a rate ranging from 3-26 feet/second and said apparatus has a percentage of NOx removal greater than or equal to 60%.

30. A combustion system according to claim 14, further comprising a stack.

* * * * *